(No Model.) 4 Sheets—Sheet 1.
A. F. TYLER.
MACHINE FOR SMOOTHING AND FINISHING BLIND SLATS.
No. 389,826. Patented Sept. 18, 1888.

WITNESSES. INVENTOR.

(No Model.) 4 Sheets—Sheet 2.

A. F. TYLER.
MACHINE FOR SMOOTHING AND FINISHING BLIND SLATS.

No. 389,826. Patented Sept. 18, 1888.

WITNESSES.
H. W. Aiken
F. V. Hayden

INVENTOR.
Arthur F. Tyler
By Teschemacher
Atty (No Model.) 4 Sheets—Sheet 3.
A. F. TYLER.
MACHINE FOR SMOOTHING AND FINISHING BLIND SLATS.
No. 389,826. Patented Sept. 18, 1888.
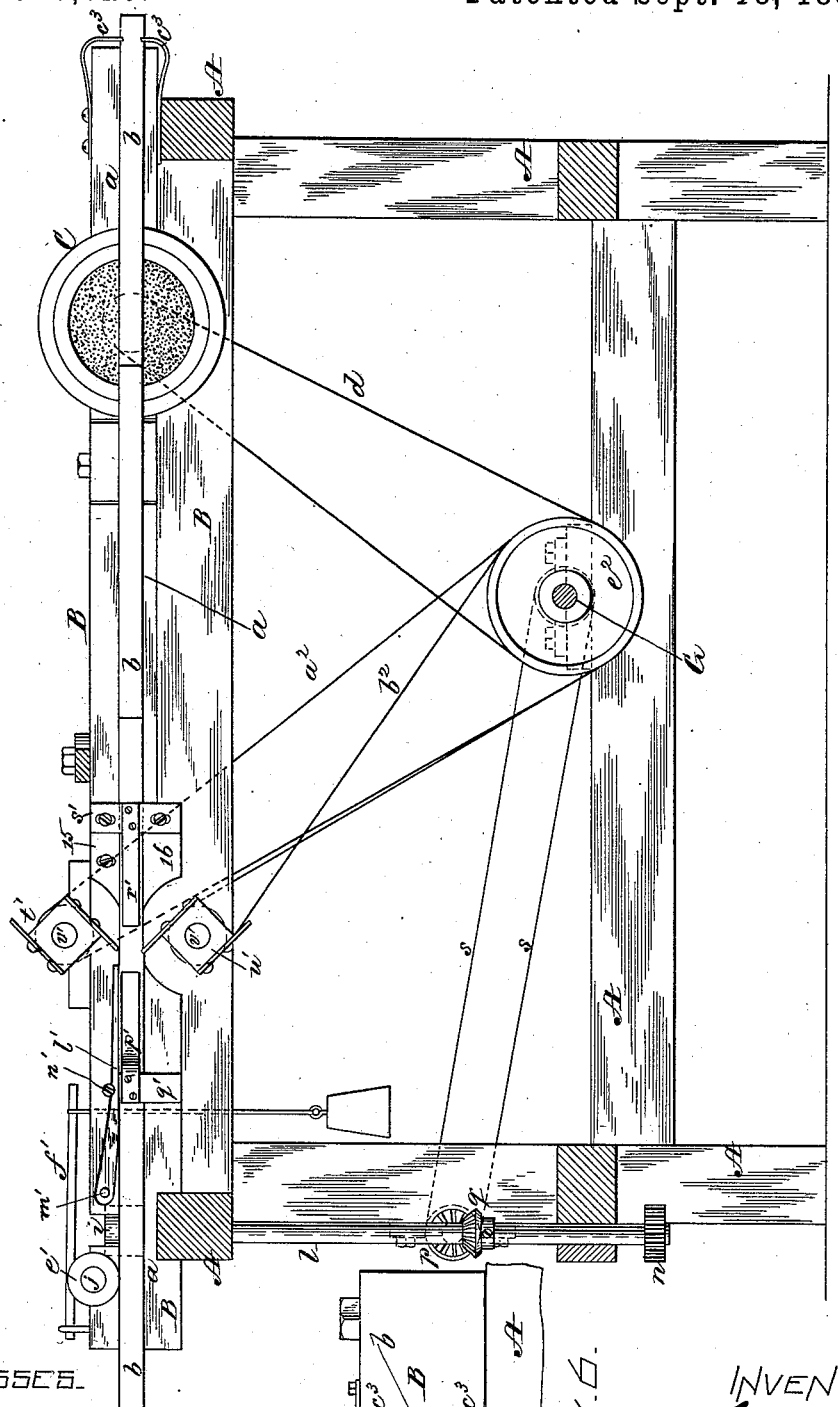
WITNESSES
H. W. Aiken
F. V. Hayden
INVENTOR
Arthur F. Tyler
By H. Teschmacher
Atty (No Model.) 4 Sheets—Sheet 4.

A. F. TYLER.
MACHINE FOR SMOOTHING AND FINISHING BLIND SLATS.

No. 389,826. Patented Sept. 18, 1888.

UNITED STATES PATENT OFFICE.

ARTHUR F. TYLER, OF ATHOL, MASSACHUSETTS.

MACHINE FOR SMOOTHING AND FINISHING BLIND-SLATS.

SPECIFICATION forming part of Letters Patent No. 389,826, dated September 18, 1888.

Application filed November 21, 1887. Serial No. 255,836. (No model.)

*To all whom it may concern:*

Be it known that I, ARTHUR F. TYLER, a citizen of the United States, residing at Athol, in the county of Worcester and State of Massachusetts, have invented certain Improvements in Machines for Smoothing and Finishing Blind-Slats, &c., of which the following is a full, clear, and exact description, reference being had to the accompanying drawings, making part of this specification, in which—

Figure 1:
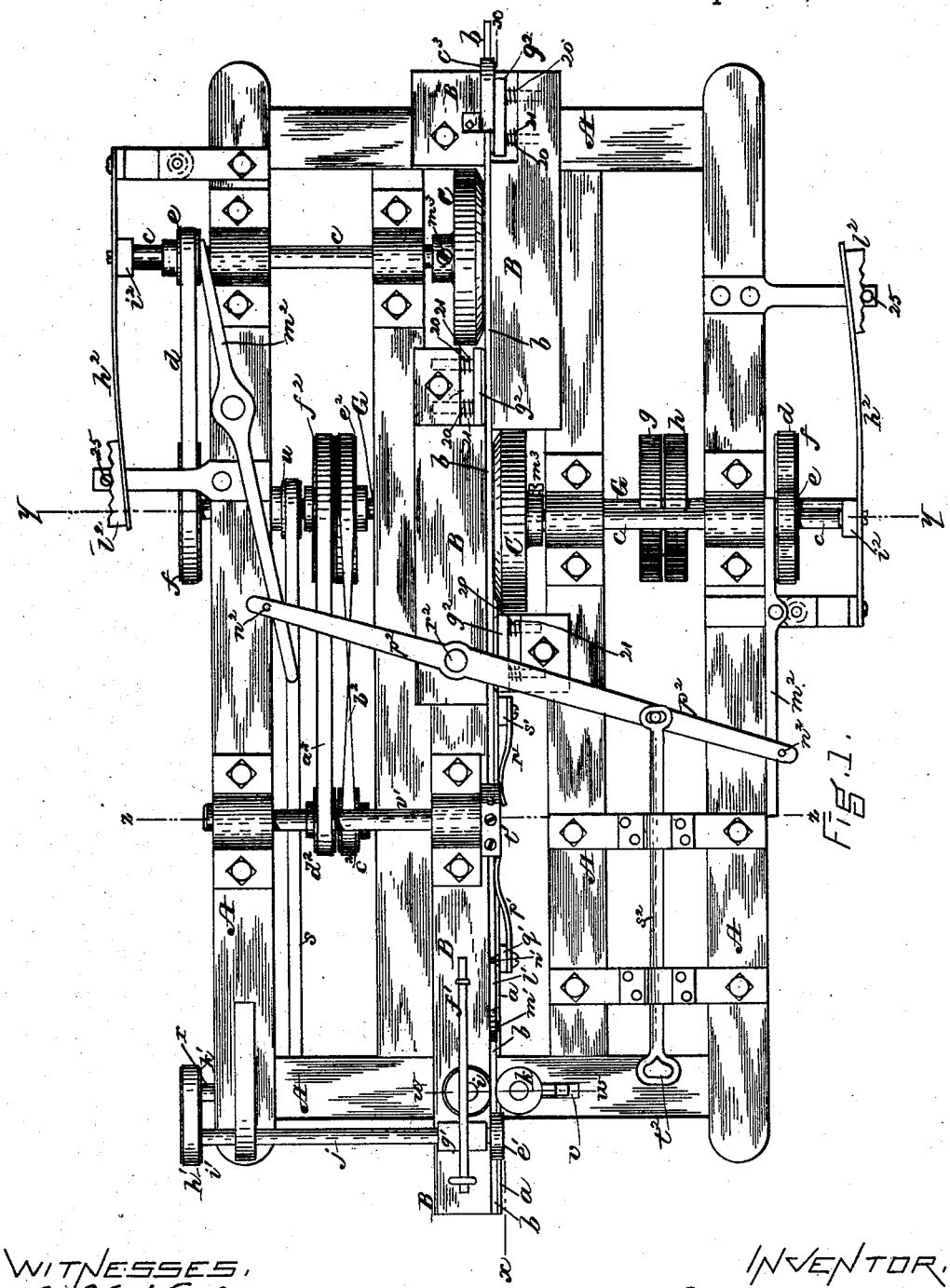
Figure 2:
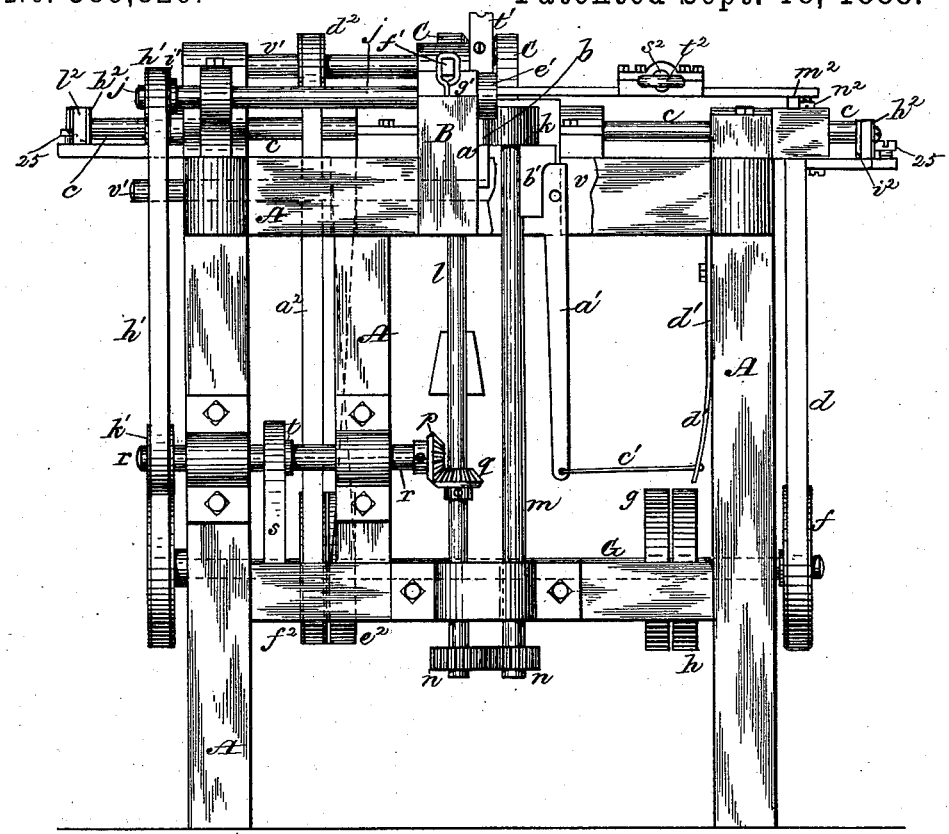
Figure 8:
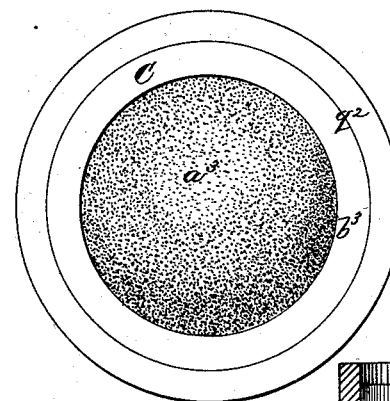
Figure 7:
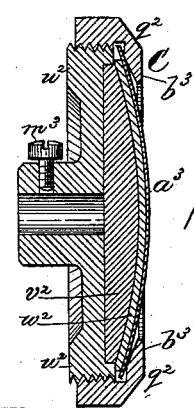
Figure 9:
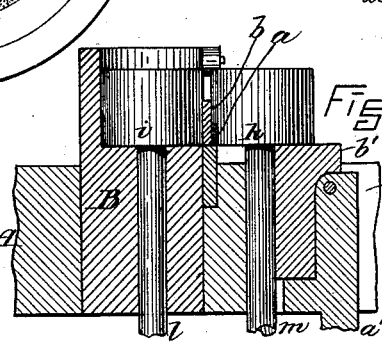
Figure 4:
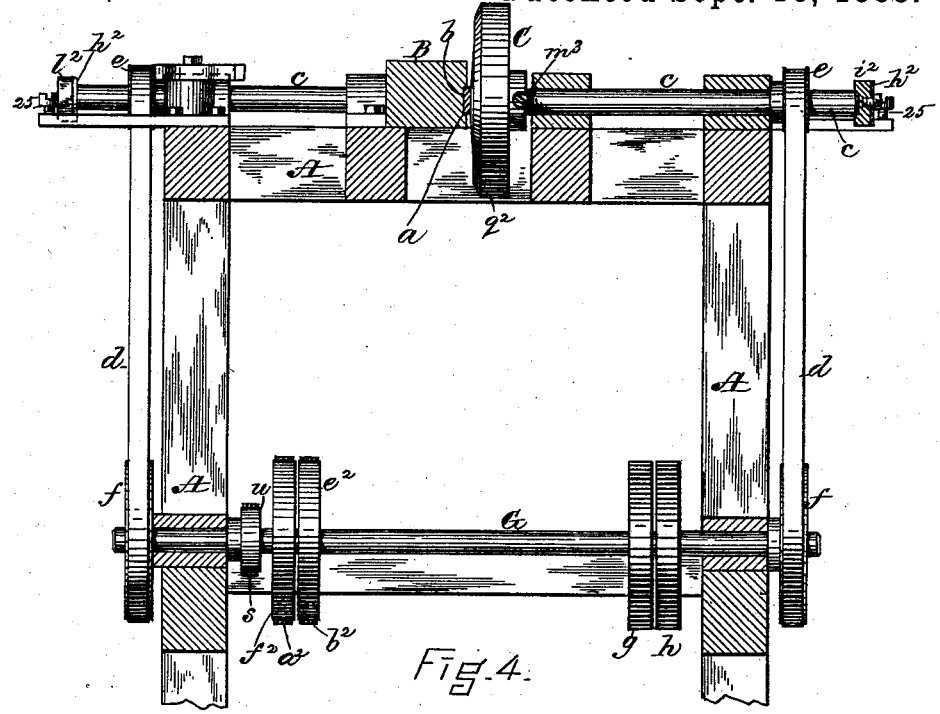
Figure 5:
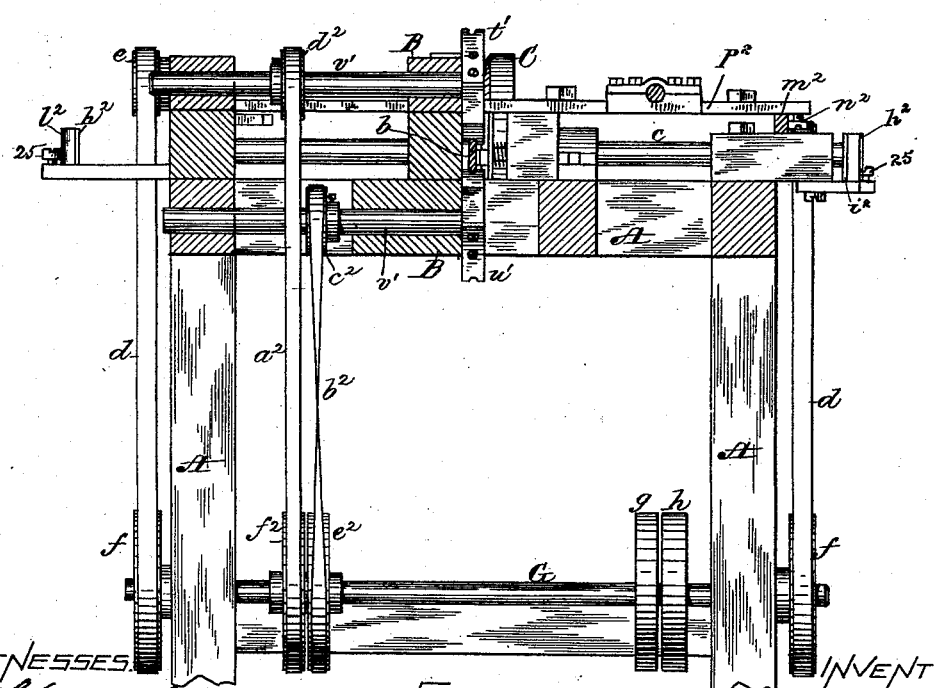

Figure 1 is a plan of my improved machine for smoothing and finishing blind-slats. Fig. 2 is an elevation of one end of the same. Fig. 3 is a longitudinal vertical section on the line $x$ $x$ of Fig. 1. Fig. 4 is a transverse vertical section on the line $y$ $y$ of Fig. 1. Fig. 5 is a transverse vertical section on the line $z$ $z$ of Fig. 1. Fig. 6 is a detail showing a portion of the rear end of the machine. Fig. 7 is an enlarged section through one of the abrading-disks. Fig. 8 is a front elevation of one of the abrading-disks. Fig. 9 is a sectional detail on line $w$ $w$ of Fig. 1.

My invention relates to an improved machine for smoothing and finishing blind-slats or other flat strips of wood; and my invention consists in certain novel combinations of parts and details of construction, as hereinafter more particularly set forth, and specifically claimed.

In the said drawings, A represents the frame-work of the machine, to the top of which, at or near the center, is secured a supporting-bed, B, extending lengthwise of the machine from one end to the other. This supporting-bed is provided with a shoulder or guideway, $a$, of suitable size and shape to receive and hold the blind-slats $b$, to be operated upon by the abrading-disks C C, which are mounted on horizontal shafts $c$ $c$, having their bearings on top of the frame-work. These abrading-disks are placed one in advance of the other, and are arranged to operate upon opposite sides of the blind-slat, as seen in Fig. 1. Each of the shafts $c$ $c$ is driven by a belt, $d$, passing over a pulley, $e$, on said shaft, and a larger pulley, $f$, on the driving-shaft G, the latter having its bearings in the lower portion of the frame-work, and being provided, as usual, with fast and loose pulleys $g$ $h$.

$i$ $k$ are the feed-rolls between which the blind-slat is passed, and by which it is carried forward through the machine. The blind-slats $b$ are successively fed into the machine between the rolls $i$ $k$ in their rough state, just as they are sawed out and without being planed, one slat following another and pressing it forward and being in turn pushed forward by the one immediately behind it, with which the feed-rolls are in contact. These feed-rolls are secured to the upper ends of two vertical shafts, $l$ $m$, running in suitable bearings in the frame-work, and connected at their lower ends by gears $n$. The shaft $l$ carries a bevel-gear, $q$, with which engages another bevel-gear, $p$, on a horizontal shaft, $r$, which is driven by a belt, $s$, running over a pulley, $t$, and another pulley, $u$, on the driving-shaft G. The upper end of the shaft $m$ passes through a slot, $v$, in the frame-work, in order that the feed-roll $k$ may move toward and from the opposite feed-roll $i$, to accommodate slats of different thicknesses, and this roll $k$ is constantly forced toward the opposite roll $i$ by a lever, $a'$, pivoted within the slot $v$, and bearing against the half-box $b'$, in which the upper end of said shaft runs. The lower end of this lever $a'$ is connected by a rod, $c'$, with a flat spring, $d'$, by which means the required pressure is produced to cause the slat to be gripped firmly between the feed-rolls. The feed-roll $i$ fits within a recess or socket in the supporting-bed B, the latter being cut away on the side to allow it to be brought into contact with the slat.

$e'$ is a pressure-roll mounted on a horizontal shaft, $j$, and located in front of the feed-rolls $i$ $k$. This roll $e'$ bears upon the upper edge of the slat, and serves to keep it firmly down upon the bottom of the guideway, and said roll is forced down upon the upper edge of the slat by means of a weighted lever, $f'$, resting upon the half-box $g'$, the shaft of this roll being driven by a belt, $h'$, passing over a pulley, $i'$, and a pulley, $k'$, on the outer end of the shaft $r$.

$l'$ is a pressure-bar, which is pivoted to the side of the supporting-bed B at $m'$, and is kept firmly down upon the upper edge of the slat by a removable pin, $n'$, and $p'$ is a flat spring, which is attached to a guide-piece, $q'$, secured to the side of the supporting-bed B, and presses against the flat side of the slat to hold it firmly against the vertical wall of the guideway $a$. $r'$ is a similar spring, which also presses against the side of the slat a short distance in advance of the spring $p'$, and is secured to a plate, $s'$, made adjustable vertically by means of slots and bolts, as seen in Fig. 3, to cause the spring to bear properly upon the slat. These pressure devices serve to hold the slat firmly while being acted upon by the edge-cutters $t'$ $u'$, which round off the top and bottom edges of the slat. These cutters, which act upon the edges of the slat at a point about midway between the pressure-springs $p'$ $r'$, are mounted upon horizontal shafts $v'$ $v'$, which are rotated by belts $a^2$ $b^2$ passing over pulleys $c^2$ $d^2$ on said shafts and pulleys $e^2$ $f^2$ on the driving shaft G. The face of the supporting-bed B is cut away to receive the edge-cutters $t'$ $u'$ and allow them to act on the edges of the slats. As the width of the slat is reduced by the action of the edge-cutters thereon, I prefer to make the guideway beyond the said cutters adjustable in width, so that it will correspond to the width of the slat as left by said cutters, which may be effected by making the portions 15 and 16 of the guideway adjustable by means of slots and bolts or screws, as seen in Fig. 3.

A series of pressure-plates, $g^2$, are alternately placed on opposite sides of the guideway $a$ in the supporting-bed, one on each side of each of the abrading-disks C, as seen in Fig. 1, which serve to hold the slats firmly while being operated upon by the abrading-disks. These presser-plates $g^2$ have each secured to the rear face two short pins or studs, 20, which enter corresponding holes in the supporting-bed, and are surrounded by spiral springs 21, by which the plates are pressed forward against the slats.

The horizontal shafts $c$ $c$ of the abrading-disks C C are adapted to slide longitudinally in their bearings to allow the disks to be withdrawn from contact with the slats, and these shafts are each pressed inward by a spring, $h^2$, the force of which is regulated by means of a notched wedge, $l^2$, introduced between the free end of the spring and a stop-pin, 25, projecting from an arm on the frame-work. Each spring $h^2$ is pivoted at one end to the frame-work, and carries an anti-friction socket or bearing-plate, $i^2$, which rests against the outer convex end of the shaft $c$, and by means of these springs $h^2$ and wedges $l^2$ the abrading-disks C C are forced up against the slats $b$ with a pressure increased in proportion as the abrading-surfaces of the disks wear away.

When it is desired to remove the disks C from their shafts $c$ for the purpose of removing the abrading-surface when worn out, the springs $h^2$ are swung back on their pivots out of the way, and the set-screws $m^3$, by which the disks are secured upon the shafts, loosened, when the shafts $c$ can be slid back in their bearings to withdraw them from their disks C, when the latter can be removed, as desired. The shafts $c$ are moved in the direction of their length against the resistance of the springs $h^2$, to withdraw the disks from contact with the slat by means of levers $m^2$ $m^2$, pivoted to the frame-work and acting against the inner sides of the pulleys $e$ $e$, the longer arms of these levers $m^2$ being acted upon by pins or projections $n^2$ on the under side of a horizontal bar, $p^2$, pivoted to the frame-work at $r^2$ and having attached to it a slide, $s^2$, provided with a handle, $t^2$, in a position easily accessible to the operator, whereby, in case the feed-rolls should not work properly, or if from other cause the slats should be arrested in their movement through the guideway, the abrading-disks C C can be instantly and simultaneously withdrawn from contact with the opposite sides of the slat, as otherwise the slat would be spoiled by the contact of the disks therewith, which would cut into its surface if it was stationary. Instead of the wedges $l^2$ any other suitable adjusting device may be used for regulating the pressure of the springs $h^2$.

Each of the abrading-disks C consists of a head, $u^2$, which is secured upon its shaft $c$ by means of the set-screw $m^3$. This head is provided on its periphery with a screw-thread over which is turned a removable flanged ring, $q^2$. The inner side of the head $u^2$ is recessed out for the reception of a backing consisting of a circular piece, $v^2$, of cork-wood or other suitable elastic material, over which is placed a circular piece of felt, $w^2$, and over the latter is placed a circular piece, $a^3$, of sand-paper, emery-cloth, or other similar abrading material, which, together with the piece of felt $w^2$ and backing $v^2$, are securely held in place between the flange $b^3$ of the ring $q^2$ and the head $u^2$, the sand-paper or emery-cloth being merely confined at its edges, whereby its outer abrading-surface is exposed in a position to act on the slat. This abrading-surface is of convex form by reason of the shape of the backing $v^2$, and when first used only its central portion acts upon the slat, but as the sand or abrading material wears off the pressure on the shaft $c$ is increased by pushing in the wedge $l^2$, which acts upon the spring $h^2$, and the felt $w^2$ then yields, which causes the convex abrading-surface to be correspondingly flattened, thus bringing more of the abrading-surface into action until the whole of said surface is finally utilized, and as soon as this surface becomes worn out the disk C is removed, a new piece of abrading material substituted for the one which is worn out, and the disk then replaced upon its shaft.

At the end of the guideway, where the finished slats leave the machine, are placed two spring-clearers, $c^3$ $c^3$, having notched ends, which fit closely upon the curved upper and lower edges of the slat, and thus serve to scrape off and clear them of dust, as the slat is forced out of the machine.

It is evident that a single abrading-disk could be used instead of two, as above described; but in such case the slat would have to be passed through the machine twice, once for each side. I therefore prefer to use two abrading-disks, as shown, in order that the slat may be perfectly smoothed and finished on both sides in passing once through the machine.

What I claim as my invention, and desire to secure by Letters Patent, is—

1. In a machine for smoothing and finishing blind-slats, the abrading-disks C C, mounted on shafts $c\ c$, adapted to slide in the direction of their length, springs $h^2\ h^2$ exerting a pressure on the ends of said shafts $c\ c$ to keep the abrading-disks in contact with the slats, levers $m^2\ m^2$, for moving said shafts to withdraw the disks from contact with the slats, and means for regulating the tension of the springs $h^2\ h^2$ to vary the pressure of the abrading-disks on the slats, substantially as described.

2. In a machine for smoothing and finishing blind-slats, the combination, with the supporting-bed and its guideway, of the abrading-disks C C, with their shafts $c\ c$, the springs $h^2\ h^2$ bearing on said shafts, means for regulating the tension of said springs, levers $m^2\ m^2$, for sliding the shafts $c\ c$ against the resistance of the springs $h^2\ h^2$, and the horizontal bar $p^2$, for operating the levers $m^2\ m^2$, whereby the abrading-disks are simultaneously withdrawn from contact with the slat, substantially in the manner and for the purpose set forth.

3. In a machine for smoothing and finishing blind-slats, the combination, with the shafts $c\ c$ and the abrading-disks C C, of the pressure-springs $h^2\ h^2$, pivoted at one end and adapted to be swung back out of the way of said shafts, said springs being provided with wedges for regulating the pressure of the springs, substantially as and for the purpose set forth.

4. In a machine for smoothing and finishing blind-slats, the combination, with the supporting-bed and its guideway, of the spring-clearers $c^3\ c^3$, adapted to fit the rounded edges of the slat and embrace the same as it leaves the guideway after being finished, substantially as and for the purpose set forth.

Witness my hand this 16th day of November, A. D. 1887.

ARTHUR F. TYLER.

In presence of—
P. E. TESCHEMACHER,
H. W. AIKEN.